(12) United States Patent
Kemppinen

(10) Patent No.: US 7,076,276 B2
(45) Date of Patent: Jul. 11, 2006

(54) MOBILE TERMINAL DEVICE COMPRISING VIBRATING COMPONENT HAVING LIGHT EFFECTS

(75) Inventor: Pasi Kemppinen, Tampere (FI)

(73) Assignee: Nokia Corportion, Espoo (FI)

( * ) Notice: Subject to any disclaimer, the term of this patent is extended or adjusted under 35 U.S.C. 154(b) by 578 days.

(21) Appl. No.: 10/431,649

(22) Filed: May 7, 2003

(65) Prior Publication Data

US 2003/0236101 A1    Dec. 25, 2003

(30) Foreign Application Priority Data

May 8, 2002    (WO)    ............ PCT/IB02/01563

(51) Int. Cl.
*H04B 1/38* (2006.01)

(52) U.S. Cl. ............ 455/567; 455/550.1; 379/373.01; 379/373.02; 379/374.03; 379/376.01; 340/815.4; 340/815.55

(58) Field of Classification Search ............ 455/550.1, 455/567; 379/373.01, 373.02, 373.03, 374.03, 379/376.01, 376.02; 340/814.4, 815.42, 340/815.43, 815.44, 815.45, 815.46, 815.55, 340/407.1; 345/84, 85, 86

See application file for complete search history.

(56) References Cited

U.S. PATENT DOCUMENTS 5,848,362 A    12/1998  Yamashita
6,470,196 B1 *  10/2002  Yamashita ............ 455/567

FOREIGN PATENT DOCUMENTS

EP    1011249    6/2000

* cited by examiner

*Primary Examiner*—Edan Orgad
*Assistant Examiner*—Raymond S. Dean

(57) ABSTRACT

Mobile phones use light signaling or vibrational effects to silently indicate to a user that e.g. a telephone call is incoming. The present invention provides a method, a component for generating vibrational effects combined with light effects and a mobile device implementing this component. The generation of the light effects is obtained from at least one light emitter (200, 201) having at least one light path (300), wherein said at least one light emitter (200, 201) is disposed relative to said mass (100) such that said mass (100) periodically blocks said light path (300) while moving, for generating light effects.

17 Claims, 1 Drawing Sheet

MOBILE TERMINAL DEVICE COMPRISING VIBRATING COMPONENT HAVING LIGHT EFFECTS

CROSS REFERENCE TO RELATED APPLICATION

This application claims priority under 35 U.S.C. § 119 from International Application Number PCT/IB02/01563 filed May 8, 2002.

BACKGROUND OF THE INVENTION

1. Technical Field

The present invention relates to a component for generating vibration effects combined with light effects. In particular, the present invention relates to a mobile terminal, especially a mobile phone, containing a component for generating vibration effects combined with light effects for alerting a user of the mobile terminal. The invention also relates to vibrational lights effects used for gaming purposes or can be used during music listening. For example in games, when something special happens, this could be shown by both light and vibration.

2. Discussion of Related Art

The alerting of a user of a mobile terminal by acoustic signals can be inconvenient since such an acoustic signal may disturb himself or other persons in the environment of the phone but also during telephone conversation, gaming, music listening and the like. Therefore, today's mobile terminals, especially mobile phones, implement a vibration signaling function to offer a user the possibility to receive a silent signaling. Alternatively, today's mobile terminals, especially mobile phones, implement an optical signaling function e.g. emitting of flashing lights, to offer a user the possibility to receive a silent signaling.

DISCLOSURE OF INVENTION

An object of the invention is to provide a method for generating vibrational effects in combination with light effects for signaling purposes and a further object of the invention is to provide a vibration component which integrates light emitting elements for signaling purposes in an advantageous manner. The vibration component is used to intercept the light path of the light emitting elements for generating light effects. Advantageously, such a vibration component is embedded in a housing which often also offers enough free space for integrating the light emitting elements without expanding or extending the housing or at least by slightly expanding the housing. Light effects generated by using a vibration component are advantageous since the generation of the light effects in accordance with the invention is produced in such a manner that no additional electromagnetic disturbances occur due to the light effects. The objects of the invention are attained by a component, a mobile terminal and a method which are described below.

According to an embodiment of the invention, a component for generating vibrational effects combined with light effects in a mobile terminal is provided. The component comprises a mass, a driver and at least one light emitter. The driver drives the mass which is moveable mounted in the component for generating vibration effects. The mass is preferably in contact with the housing of the component for passing on the vibration effect to a user. The at least one light emitter has at least one light path for observing the emitted light. The at least one light emitter is disposed relative to the mass such that the mass periodically blocks said light path during movement for generating light effects. The mass may be disposed adjacent said light emitter. Advantageously, the at least one light emitter and the driver may be in electrical contact to be operated simultaneously.

According to an embodiment of the invention, the driver drives the mass periodically such that the mass also penetrates periodically into the at least one light path.

According to an embodiment of the invention, the mass is mounted on an eccentric pivot and the driver rotates the mass on this pivot, such that the rotating mass generates vibrations.

According to an embodiment of the invention, the at least one light emitter is at least one light emitting diode (LED).

According to an embodiment of the invention, the at least one light emitter is able to emit light of different color.

According to an embodiment of the invention, the surface of the mass is partially light reflecting, partially light refracting, partially structured and/or partially colored.

According to an embodiment of the invention, the mass has a semi-cylindrical or hemispherical shape.

According to an embodiment of the invention, the at least one light emitter flashes during operation.

According to an embodiment of the invention, a housing contains the mass and the at least one light emitter. The housing further provides at least one translucent area of the housing for transmitting the at least one light path.

According to an embodiment of the invention, the translucent area of the housing is at least partially transparent or at least partially opaque.

According to an embodiment of the invention, a mobile terminal offering vibrational effects combined with light effects for signaling to a user is provided. The mobile terminal contains a component for generating vibrational effects combined with light effects. The component comprises a mass, a driver and at least one light emitter. The driver drives the mass which is movably mounted in said component for generating vibrational effects. The at least one light emitter has at least one light path for observing the emitted light. The at least one light emitter is disposed relative to the mass—preferably adjacent—such that said mass periodically blocks said light path while moving, for generating light effects. Preferably, the at least one light emitter and the driver may be in electrical contact in order to be operated simultaneously.

According to an embodiment of the invention, the mobile terminal has a housing. This housing contains the aforementioned component. The housing has at least one translucent area arranged within the at least one light path for passing through the emitted light. Preferably, the translucent area of the housing is at least partially transparent or at least partially opaque.

According to an embodiment of the invention, the mobile terminal device is a mobile phone.

According to an embodiment of the invention, an electronic device is provided having a component in accordance with the aforementioned embodiments according to the component for generating vibrational effects combined with light effects of the present invention.

According to an embodiment of the invention, a method for generating vibrational effects combined with light effects in a mobile terminal. A mass is moved in order to generate vibrational effects. The driven mass blocks at times at least one light path for generating light effects, wherein the light path is preferably defined between at least one light emitter and an observer. Therefore, the at least one light emitter is preferably disposed adjacent to the mass. The at least one light emitter and the driver may be electrically connected in order to be operated simultaneously.

According to an embodiment of the invention, the mass is periodically driven so that also the mass periodically blocks the at least one light path.

According to an embodiment of the invention, the driver rotates the mass on an eccentric pivot for generating vibrational effects.

According to an embodiment of the invention, the at least one light emitter flashes.

Preferably said method is used for other purposes and in other environments, wherein the generated light effect is used in games and/or music listening and/or call alarms.

BRIEF DESCRIPTION OF THE DRAWINGS

The invention will be described in greater detail by the means of preferred embodiments with reference to the accompanying drawings, in which.

BEST MODE FOR CARRYING OUT THE INVENTION

Figure 1:
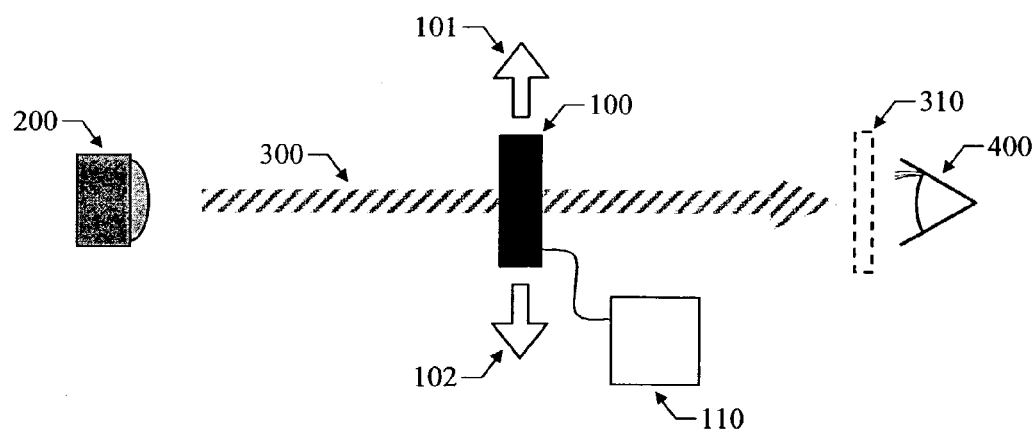
FIG. 1 shows a schematic block diagram illustrating the principle setup of a component with respect to an embodiment of the invention.

The following description relates to a component according to embodiments of the invention. Same or equal parts shown in the figures will be referred by the same reference numerals.

FIG. 1 shows a schematic block diagram illustrating the principle setup of a component with respect to an embodiment of the invention. The principle setup comprises a mass 100 and a driver 110 which drives the mass, both the mass 100 and the driver 110 representing the active parts of a vibration generating setup, a light emitter 200 and a light path 300 to an observer 400.

The mass 100 is reciprocated by the driver 110. The driving directions upwards and downwards shown in FIG. 1 by indicating arrows 101 and 102 are an example, but not limiting. The movement of the mass 100 is performed in such a manner that the movement generates vibrations excited by the driver 110. Preferably, the generated vibrations are passed on to a housing of the component and further to an electronic device containing the component or its housing, respectively. The vibrating housing can be sensed by a user.

The moving mass 100 is used to penetrate the light path 300. The moving mass covers and uncovers the light path so that an observer 400 can view the light emitter 200 during an uncovered period of time and during the covered period of time no direct light may pass to the observer 400.

The aforementioned movement of the mass penetrating preferably periodically into the light path leads to a flashing or stroboscopic light impression of the observer 400.

A window 310 may be interposed in the light path 300. This window may be a blank of a housing or may be a window 310 made of glass or translucent polymeric material.

Figure 2A:
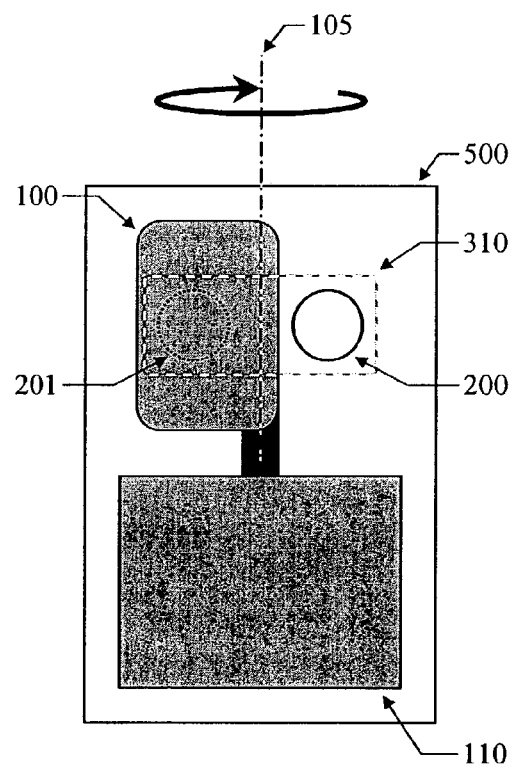
FIG. 2a shows a block diagram illustrating a vibration generator including light elements in a first operational position according to an embodiment of the invention and FIG. 2b shows a block diagram illustrating a vibration generator including light elements in a second operational position according to an embodiment of the invention.
Figure 2B:
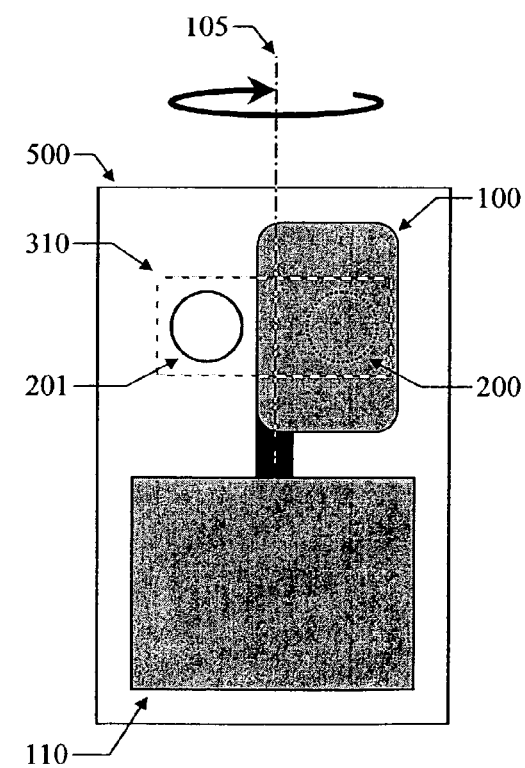

FIG. 2a and FIG. 2b show a block diagram illustrating a vibration generator including light emitters in a first and a second operational position according to an embodiment of the invention. The depicted embodiment comprises a driver 110, here an electric motor, and a mass 100 mounted eccentrically on the pivot 105 of the driver 100. The driver 100 drives the eccentrically mounted mass 100 into a rotational movement which causes vibrations. The strength of the generated vibrations can be controlled by the rotational speed of the driver 100 or the electric motor, respectively. Preferably different driving speeds can be adjusted. Further, the speed can preferably be increased gradually. For example speed can increase or decrease with time and this will generate different kind of light effects.

Preferably, the mass 100 can have a semi-cylindrical, hemispheric shape or may present any similar design. The effected vibrations are achieved by an eccentric rotational pivot on which the mass 100 is rotated, advantageously with an adequate fast rotational speed.

Further, the depicted embodiment comprises also two light emitters 200 and 201, here two light emitting diodes (LED). The light emitters 200 and 201 are covered alternately by the reciprocating mass 100. In order to illustrate the alternating coverage FIG. 2a and FIG. 2b depict the operational position of the mass 100 driven by the electric motor 110 scanning between about 180°.

In FIG. 2a the light emitter 201 is covered by the mass 100, that is the light path of the light emitter 201 is intercepted by the mass 100, whereas the light emitter 200 is unobstructed. Direct light can only be obtained from light emitter 200, whereas light of the light emitter 201 may only be obtained by reflection, diffraction and the like of the light on adjacent surfaces.

In FIG. 2b the light emitter 200 is covered by the mass 100, that is the light path of the light emitter 200 is intercepted by the mass 100, whereas the light emitter 201 is uncovered. Direct light can only be obtained from light emitter 201, whereas light of the light emitter 200 may only be obtained by reflection, diffraction and the like of the light on adjacent surfaces.

The alternative covering of the two light emitters 200 and 201 leads to a flashing or stroboscopic effect of the emitted light which advantageously is especially effective in combination with different colors of the light emitted by the light emitters 200 and 201. The two light emitters 200 and 201 emit different colored light.

Additionally, further light effects may be obtained by especially designing the surface of the mass or the shape of the mass. For example, the surface of the mass 100 or an area of the surface can be reflective (e.g. a surface coated by metallic material or a polished surface), and/or colored in order to generate further light effects in combination with the flashing or stroboscopic effect, respectively. The surface of the mass 100 or areas of its surface may be structured, e.g. offering different reflectivity, different color or even light diffraction. The mass 100 may have parts leaving a blank for generating additional effects. Furthermore, the mass can be refractive.

Preferably, the driver 110, the mass 100 and the two LEDs are contained in a common housing 500 or container 500, respectively. Preferably, the inside surface of the housing can have a reflective surface (e.g. a surface coated by metallic material or a polished surface) and/or a colored surface to enhance the generated light effects.

Such a housing 500 can have blanks to transmit the light path or the light of the light emitters 200 and 201. Advantageously, the housing 500 can have a window 310, e.g. a glass window or a window made of translucent polymeric material, to pass through the light of the light emitters 200 and 201. Preferably, the window 310 is translucent, more preferably, the window 310 is transparent. Further, also an opaque window 310 can be used to pass through emitted light. The window can have a rough or profiled surface for scattering incident light. Advantageously, the window can be additionally colored. Further, the window may have optical properties like filter properties, lattice properties or lens properties as known from typical optical means.

The depicted component exciting vibration effects combined with light effects may be built-in a mobile terminal, especially a mobile phone. Such a component implementing light emitters need no additional space or at most little more space. The combination offers several possibilities in application design and in general personalization of such a mobile terminal. The vibrational effects and the light effects can be set up individually by a user e.g. by offering a user interface for defining the effects. For example, the vibration effect can be personalized by switching on/off, by defining the strength of the vibration effect, by defining a periodic excitement of the driver 110 and the like. The light effect can be personalized by defining switching on/off, by defining a color in case of implementing multi-color light emitters, by defining a flashing period of time and the like.

The housing of the mobile terminal containing the component for generating vibration effects in combination with light effects has preferably a window implemented in its housing. The window may be a window having optical properties of the aforementioned window 310.

It will be evident to a person skilled in the art that as the technology advances, the inventive concept can be implemented in a number of ways. The invention and its embodiments are thus not limited to the examples described above but may vary within the scope of the claims.

The invention claimed is:

1. Component for generating vibration effects in a mobile terminal, comprising:
   a mass (100) moveably mounted in said component, and
   a driver (110) associated with said mass for driving said mass, thereby generating vibration effects,
   characterized by:
   at least one light emitter (200, 201) having at least one light path (300),
   wherein said at least one light emitter (200, 201) is disposed relative to said mass (100) in such way that said mass (100) periodically blocks said light path (300) while moving, for generating light effects combined with said vibration effects.

2. Component according to claim 1, wherein said mass (100) is mounted on an eccentric pivot (105) and said driver (110) is for rotating said mass (100) on said pivot (105).

3. Component according to claim 1, characterized in that said at least one light emitter (200, 201) is a light emitting diode (LED).

4. Component according to claim 1, characterized in that said at least one light emitter (200, 201) is adaptable to emit light of different colors.

5. Component according to claim 1, characterized in that at least an area of a surface of said mass (100) reflects light, refracts light, is structured and/or is colored.

6. Component according to claim 1, characterized in that said mass (100) has a semi-cylindrical or a hemispherical shape.

7. Component according to claim 1, characterized in that at least said mass (100) and said at least one light emitter (200, 201) are accomodated in a housing (500), wherein said housing (500) comprises at least one translucent area (310) arranged within said at least one light path (300).

8. Component according to claim 7, characterized in that said translucent area (310) is at least partially transparent and/or at least partially opaque.

9. Mobile terminal device offering vibrational effects, containing a component for generating vibrational effects, comprising:
   a mass (100) moveably mounted in said component, and
   a driver (110) for driving said mass for generating vibrational effects, characterized by:
   at least one light emitter (200, 201) each having at least one light path (300) for observation (400),
   wherein said at least one light emitter (200, 201) is disposed relative to said mass (100) in such way that said mass (100) periodically blocks said light path (300) while moving, for generating light effects combined with said vibrational effects.

10. Mobile terminal device according to claim 9, characterized in that said mobile terminal has a housing containing said component, wherein said housing has at least one translucent area arranged within said at least one light path.

11. Mobile terminal device according to claim 9, wherein said mobile terminal device is a mobile phone.

12. Electronic device containing a component for generating vibrational effects combined with light effects according to claim 1.

13. Method for generating vibrational effects in a mobile terminal, comprising the steps of:
   moving a mass (100) for generating vibrational effects, characterized by
   blocking a light path (300) by said moving mass (100) for generating light effects combined with said vibrational effects.

14. Method according to claim 13, characterized by:
   periodically driving said mass (100) and
   periodically blocking said light path (300).

15. Method according to claim 13, said moving characterized by:
   rotating said mass (100) on an eccentric pivot (105) for generating said vibrational effects.

16. Method according to claim 13, characterized by flashing said at least one light path (300).

17. Method according to claim 13, wherein the generated light effect is used in games and/or music listening and/or call alarms.

* * * * *